(12) United States Patent
Schwiegerling et al.

(10) Patent No.: US 6,202,040 B1
(45) Date of Patent: Mar. 13, 2001

(54) IMAGE MODIFIERS FOR USE IN SCANNING PHOTOGRAPHIC IMAGES

(75) Inventors: James T. Schwiegerling, Tucson, AZ (US); William F. Coyer, Princeton, NJ (US)

(73) Assignee: The University of Arizona, Tucson, AZ (US)

( * ) Notice: Subject to any disclaimer, the term of this patent is extended or adjusted under 35 U.S.C. 154(b) by 0 days.

(21) Appl. No.: 09/314,940

(22) Filed: May 20, 1999

(51) Int. Cl.[7] .............................. G06F 9/455; G03B 11/00
(52) U.S. Cl. ................................. 703/6; 703/2; 396/311; 396/316; 396/322; 382/299; 382/302
(58) Field of Search ........................... 703/6, 2; 396/310, 396/311, 316, 322, 331, 340, 439, 544; 382/302, 276, 283, 299, 136, 137; 345/422; 351/239; 235/462.24; 40/615

(56) References Cited

U.S. PATENT DOCUMENTS

| | | | |
|---|---|---|---|
| 4,945,500 | * 7/1990 | Deering | 345/422 |
| 5,414,947 | * 5/1995 | Hjaltason | 40/615 |
| 5,440,360 | * 8/1995 | Torrey et al. | 351/239 |
| 5,515,118 | * 5/1996 | Torrey et al. | 351/239 |
| 5,649,259 | 7/1997 | Hylén | 396/544 |
| 5,682,697 | * 11/1997 | Hjaltason | 40/615 |
| 5,828,819 | 10/1998 | Do et al. | 345/431 |
| 6,056,198 | * 5/2000 | Rudeen et al. | 235/462.24 |

OTHER PUBLICATIONS

T.L. Kunii et al., A Diffusion Model for Computer Animation of Diffuse Ink Painting, Computer Animation '95, Proceedings, 1995, pp. 98–102, Feb. 1995.*

I. Giakoumis et al., Digital Restoration of Painting Cracks, Proceedings of the 1998 IEEE International Symposium on Circuits and Systems, ISCAS '98, 1998, vol. 4, pp. 269–272, Mar. 1998.*

A. de.A. Araujo et al., Enhancement of Sketch Contours on Paintings Infrared Photographs by Optimal Filtering, Second Workshop on Cybernetic Vision, 1996, pp. 231–236, Jan. 1997.*

K.R. Crounse et al., Image Halftoning with Cellular Neural Networks, IEEE Transactions on Circuits and Systems II: Analog and Digital Signal Processing, vol. 40, No. 4, Apr. 1993, pp. 267–283, Apr. 1993.*

* cited by examiner

Primary Examiner—Kevin J. Teska
Assistant Examiner—Russell W. Frejd
(74) Attorney, Agent, or Firm—Oblon, Spivak, McClelland, Maier & Neustadt, P.C.

(57) ABSTRACT

A system and a method for modifying an original image to simulate a painting effect, wherein an irregularly translucent diffusion element is configured to be overlayed with an original image such as a photograph or picture and a scanner or photocopier is configured to scan an imaging area adjacent the original image overlayed with the diffusion element and produce image data representative of the original image modified by the diffusion element. Alternatively, the painting effect can be simulated in software to produce shifts in pixels of original image data and display a distorted image with painting effect based on the shifts in pixel values.

33 Claims, 9 Drawing Sheets

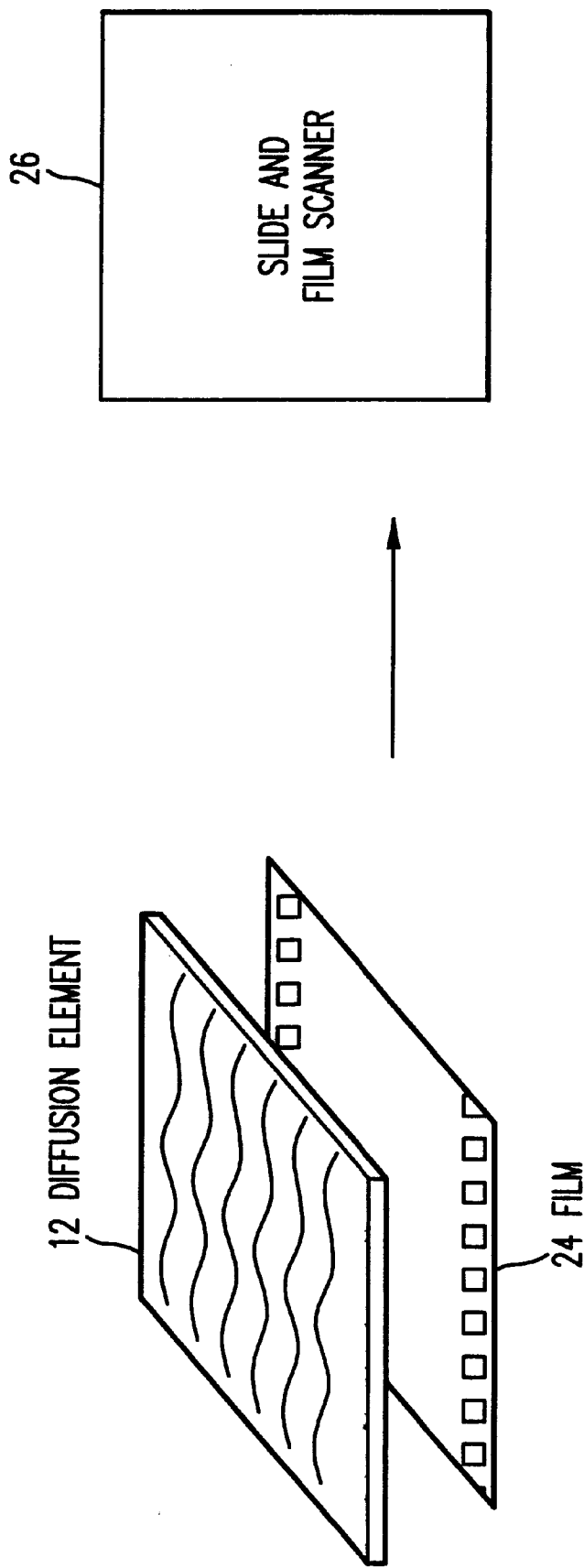

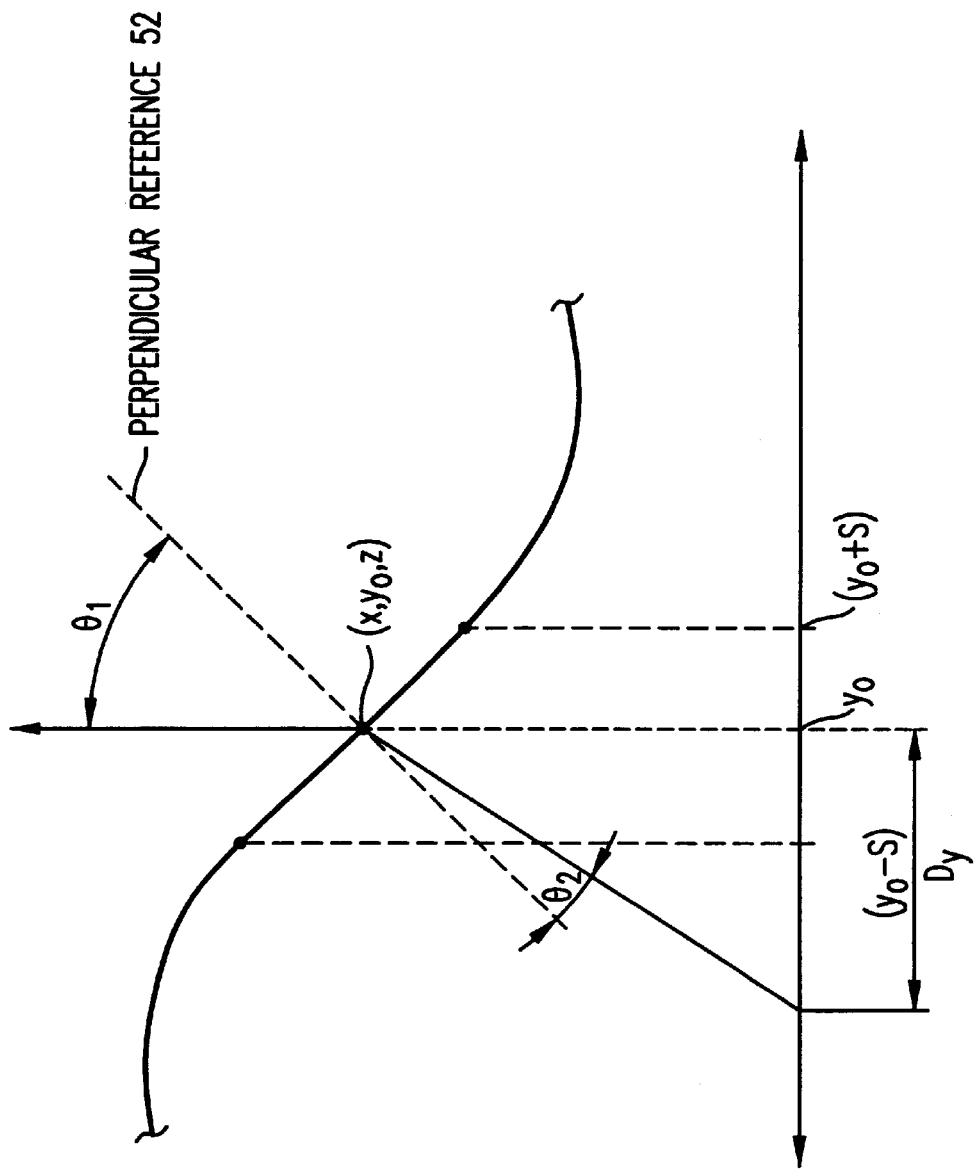

IMAGE MODIFIERS FOR USE IN SCANNING PHOTOGRAPHIC IMAGES

BACKGROUND OF THE INVENTION

1. Field of the Invention

The present invention relates generally to a system for modifying photographic images and drawings and more particularly to a system for distorting photographic images and drawings to simulate a painting effect.

2. Discussion of the Background

Today, more and more households have personal computers equipped with scanners. Scanners provide a mechanism for obtaining digital representations of pictures, photographs and documents. Presently, the typical computer user utilizes scanners to "scan in" documents in order to save time from manually typing in the content of the scanned document or for digitally storing the contents of the scanned document. It is also common for computer users to "scan in" photographs or pictures to be integrated into computer presentations or to be used as screensavers and the like.

Creating special effects of input drawings and photographs using a computer equipped with a scanner is a growing trend. Many, if not all, of the special effects are created by software driven processing after a picture or photograph has been scanned. Thus, the effects are not a function of the content scanned by the scanner. The conventional technique for modifying processed images using a personal computer includes scanning a processed image and subsequently modifying the scanned data using "painting" software to create a painting like representation of the processed image on the computer's graphics system. This type of system generally does not give a satisfactory effect to users and its expense is a function of the required software.

Another method for creating special effects related to photographs is disclosed in U.S. Pat. No. 5,649,259 to Hylen. The Hylen patent discloses an attachment for a camera for altering the light of an image prior to the image being recorded on film by a camera in order to create a painting-like photograph. A transparent plate is mounted at the film plane within the camera to create the effect. The transparent plate includes a translucent diffusion pattern which diffuses incoming light rays reflected from the subject and repositions them in a manner prior to the light exposing the film.

Notwithstanding the attachment disclosed in the Hylen patent for creating a photograph with the painting-like effect. There exists a need to create this type of effect for preexisting pictures and photographs using a computer and a scanner wherein the input picture or photograph is in its normal non-effected state.

SUMMARY OF THE INVENTION

Accordingly, an object of the present invention is to provide a novel technique for creating special effects for existing drawings and photographs.

Another object of this invention is to provide a novel scanning system which distorts an input image in order to generate output data representative of the scanned input image with a simulated painting effect with or without utilizing "painting" software.

Yet another object of the invention is to provide a system and method for obtaining a painting-like effect of a preexisting photograph in contrast to the known method of configuring a camera to obtain the painting-like effect while the photograph is being taken.

Still another object of the invention is to provide a flexible scanning system using scanners configured to scan pictures and photographs (i.e., flatbed scanners), scanners configured to scan slides and films, and photocopiers.

These and other objects are achieved according to the present invention by providing a novel system for modifying photographic images and drawings using a scanner wherein an irregularly translucent diffusion element is configured to be overlayed with an original image such as a photograph or picture and the scanner is configured to scan an imaging area adjacent the original image overlayed with the diffusion element and produce image data representative of the original image modified by the diffusion element. The diffusion element has a base portion with a base thickness T, an irregular portion extending from the base portion and having a maximum thickness $\Delta Z$, and is made of a material having an index of refraction N. The irregular portion of the diffusion element includes sectors having corner points separated in a two dimensional X, Y grid by distances $\Delta X$ and $\Delta Y$ which define peaks and troughs of the respective sectors.

Furthermore, the objects stated above and others are achieved according to the present invention by providing a novel method for modifying photographic images and drawings using a scanner including the steps: overlaying an irregular translucent diffusion element over an original image bearing element including the original image; placing the original image bearing element with the diffusion element overlayed with the original image onto an imaging area; scanning the original image bearing element overlayed with the diffusion element with scanning light so as to produce light representative of a distorted image of the original image; and, processing the light representative of the distorted image to produce the image data.

In addition, the objects stated above and others are achieved according to the present invention by providing a novel computer implemented method and computer program product for simulating the effects of a diffusion element having an index of refraction, N, on a two dimensional image stored in the computer's memory, comprising the steps of: defining a grid of grid pixels having uniform spacing, S, and dimensioned in correspondence with the two dimensional image such that each grid pixel corresponds to an image pixel of the stored two dimensional image; defining sectors having dimensions ($\Delta X$, $\Delta Y$) within the grid, where $\Delta X$ and $\Delta Y$ are multiples of S; assigning height values, Z, at the grid pixel location of each corner of each sector, wherein the height values, Z, are determined relative to a base thickness, T, of the diffusion element being represented; interpolating Z values for each grid pixel not having an assigned Z value; simulating distortion of the stored two dimensional image by the represented diffusion element by shifting for each image pixel corresponding to the respective grid pixels an amount in the X direction, DX, and an amount in the Y direction, DY, as a function of T, Z, and N; and, displaying a simulated distorted image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic illustration of a diffusion element overlayed film prior to inserting the film into a slide and film scanner in accordance with another embodiment of the invention;

FIGS. 6b, 6c, 6d, and 6e are schematic illustrations of how the modifier parameters of the diffusion element effect the degree of distortion to the original image shown in FIG. 6a.

FIG. 9 is a flow chart showing steps for performing the method of the invention; and, FIG. 10 is a schematic illustration of a portion of the diffusion surface shown in FIG. 5a.

DETAILED DESCRIPTION OF THE PREFERRED EMBODIMENTS

Figure 1:
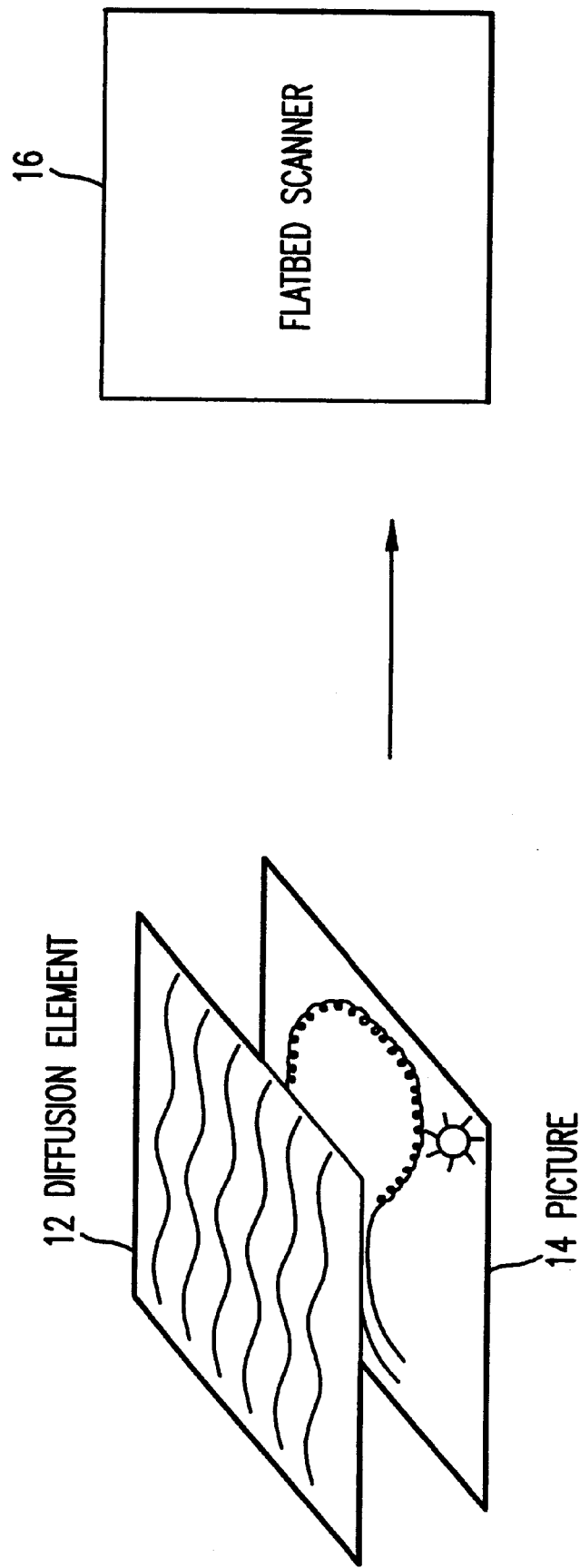
FIG. 1 is a schematic illustration of a diffusion element overlayed a picture or photograph prior to placing the picture in the scanner bed in accordance with an embodiment of the invention.

Referring now to the drawings, wherein like reference numerals designate identical or corresponding parts throughout the several views, and more particularly to FIG. 1 thereof, a representative illustration of the scanning system is shown having a diffusion element 12, an input picture 14, and a flatbed scanner 16. A diffusion element 12, in accordance with an embodiment of the invention, is positioned on top of the face of the picture 14 and is placed in the bed of flatbed scanner 16 such that the diffusion element 12 is between the light source of the scanner 16 and the picture 14. The diffusion element 12 is positioned on top of the face of the picture 14 because flatbed scanners scan using a reflective process. Diffusion element 12 can be overlayed the picture 14 by clipping the edges of the diffusion element to the picture 14 or by using clear tape or by simply overlaying the diffusion element 12 with the picture 14. The specific features regarding the use and configuration of the scanner 16 are conventional and are therefore not shown or described in full detail. Any conventional scanner capable of producing data representative of a scanned image can be used. Any conventional printer capable of printing images of scanned image data can be used to print the distorted image data. The input picture 14 can be a photograph or any picture suitable to be scanned.

With reference to FIG. 2, a representative illustration of the scanning system in accordance with a second embodiment of the invention is shown having a diffusion element 12, film 24 and a slide and film scanner 26. The diffusion element 12 is shown in FIG. 2 positioned on top of the film 24; however, because the scanning process of a slide and film scanner is a transmissive process not a reflective process, the diffusion element 12 can be placed on either face of the film 24. The film 24 with the diffusion element 22 overlayed (on top or beneath the film 24) is then inserted into the slide and film scanner 26. The specific features regarding the use and configuration of the film scanner 26 are conventional and are therefore not shown or described in full detail. Any conventional film or slide scanner capable of producing data representative of a scanned image can be used. A slide can be used as input in lieu of the film 24.

Figure 3B:
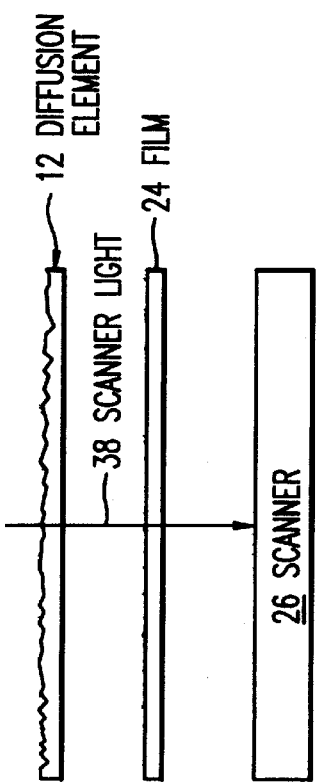
FIG. 3b is a schematic illustration of the transmissive scanning process in accordance with the second embodiment of the invention.
Figure 3C:
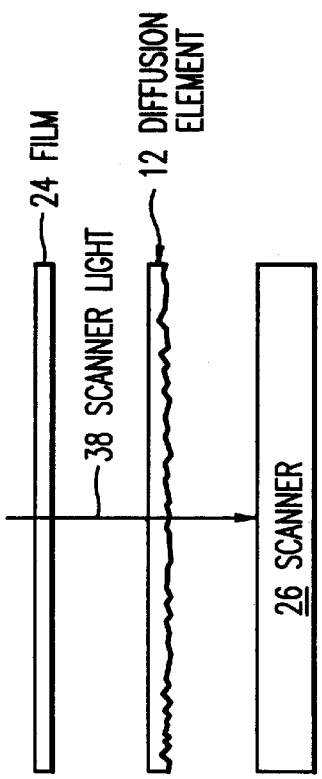
FIG. 3c is a schematic illustration of the transmissive scanning process in accordance with a third embodiment of the invention.
Figure 3A:
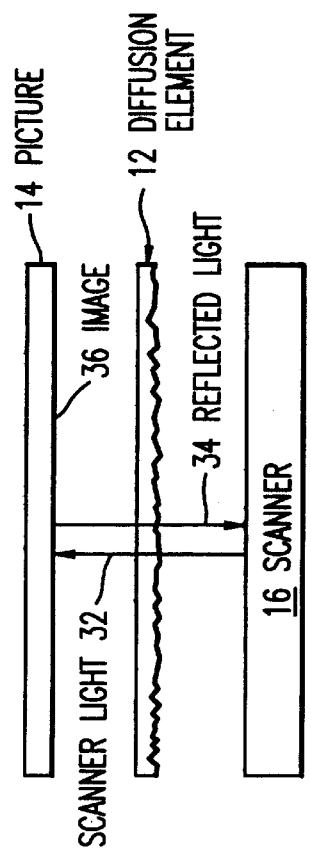
FIG. 3a is a schematic illustration of the reflective scanning process in accordance with the first embodiment of the invention.

With reference to FIG. 3a, a representative illustration of the reflective scanning process in accordance with the first embodiment of the invention is shown. Scanner light 32 is generated by the flatbed scanner 16, transmitted through the diffusion element 12, and reflected off of the image 36 of the picture 14 creating reflected light 34. Reflected light 34 is transmitted through the diffusion element 12 and processed by the flatbed scanner 16.

With reference to FIG. 3b, a representative illustration of the transmissive scanning process in accordance with the second embodiment of the invention is shown. Scanner light 38 is transmitted through the diffusion element 12, film 24, and is then processed by the film and slide scanner 26. FIG. 3c is a representative illustration of the transmissive scanning process in accordance with a third embodiment of the invention wherein the scanner light 38 is transmitted through the film 24 before it is transmitted through the diffusion element 12.

The diffusion element 12 contains a diffusion pattern and functions as a translucent mask to modify an image by diffusing and distorting the incident light generated by the flatbed scanner 16 and reflected off the picture 14 prior to it being processed by the scanner 16. The diffusion element 12 functions in the same manner in the film scanner 26 as it does in the flatbed scanner 16 except that it diffuses and distorts the incident light generated by the film scanner 26 and transmitted through the film 24. The diffusion element 12 is preferably formed of optical grade plastic. The optical grade plastic is manufactured to have a diffusion pattern on one face and to be flat on the other.

The diffusion element has a base portion with a base thickness T, an irregular portion extending from the base portion and having a maximum thickness $\Delta Z$, and is made of a material having an index of refraction N. The irregular portion of the diffusion element includes sectors having corner points separated in a two dimensional X, Y grid by distances $\Delta X$ and $\Delta Y$ which define peaks and troughs of the respective sectors.

When incident light rays pass through the diffusion element 12 and strike a portion of the diffusion pattern, the particular rays are randomly diffused, but are not blocked, prior to the reflected light being processed by the scanner in the case of a flatbed scanner. The diffusion pattern distorts the light of the scanner, and therefore also the image. The distortion of the image is directly related to the particular diffusion pattern. The deviation of the scanner light aids in achieving the desired special painting effect to the exposed image.

Figure 9:
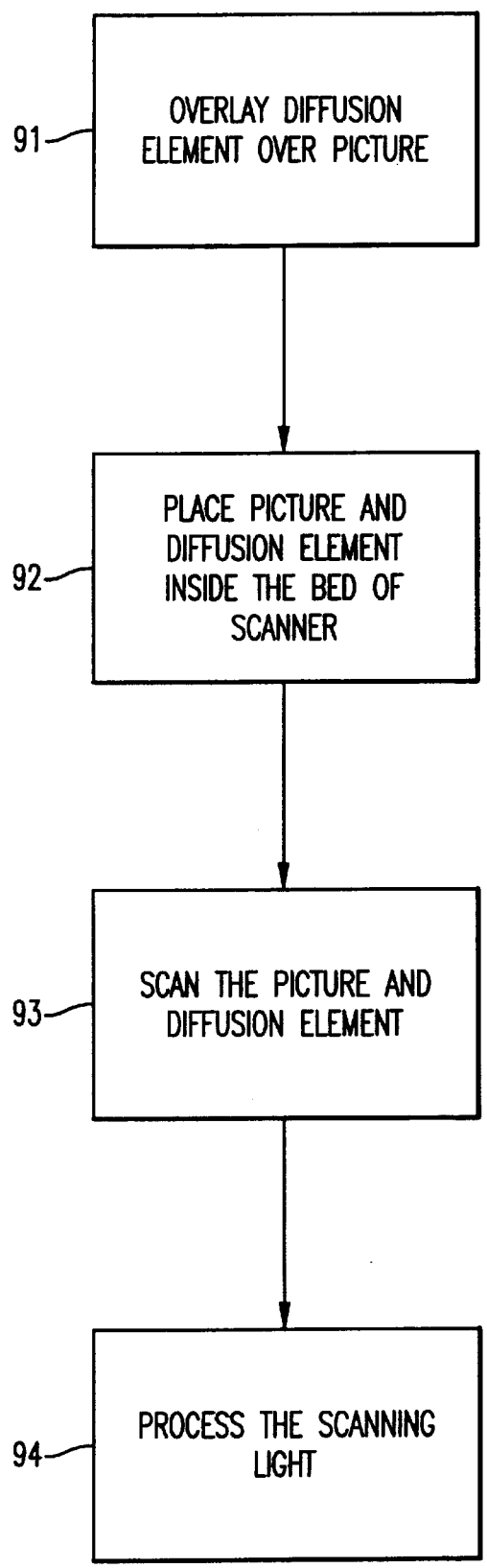

With reference to FIG. 9, a flow chart showing the method steps of the invention is shown. The first step, 91, includes overlaying a diffusion element 12 having an irregular surface over an input picture 14. After the diffusion element 12 has been overlayed, the next step, 92, includes placing the input picture 14 with the diffusion element 12 overlayed the picture 14 inside the bed of the scanner 16. Next, in step 93, the input picture 14 overlayed with the diffusion element 12 is scanned so as to produce light representative of a distorted image of the input picture 14. Lastly, step 94 provides for processing the light representative of the distorted image of the input picture to produce the distorted image data. Any conventional printer capable of printing images of scanned image data can be used to print the distorted image data.

In order to scan films or slides according to the second embodiment of the invention using a film and slide scanner 26, the film 24 with the diffusion element 12 either overlayed or placed under the film 24 is inserted into the scanner 26 during step 92.

Figure 4:
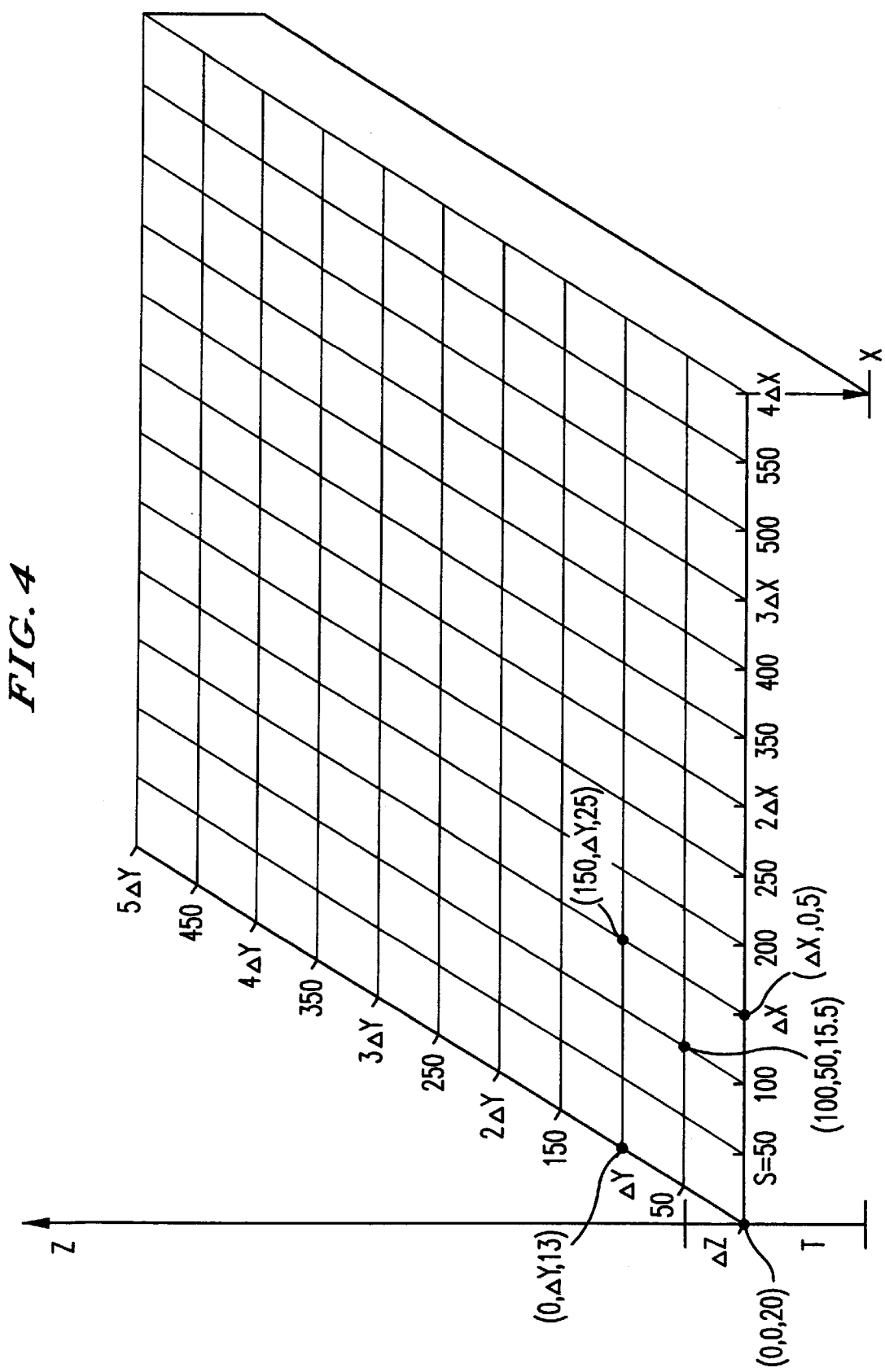
FIG. 4 is a schematic illustration of a diffusion element with various modifier parameters indicated.

To produce diffusion element 12, first a computer simulation is performed to simulate the effects of a diffusion pattern on an image. The simulation ultimately outputs height data (Z) of the diffusion pattern at every pixel X, Y along the simulated diffusion pattern's surface. With reference to FIG. 4, a schematic illustration of a diffusion element 12 with various modifier parameters indicated is shown. These parameters include: (1) the uniform spacing of pixels (S) in the (X, Y) plane (generally 10 to 100 microns, preferably 50 microns) (2) the spacing ($\Delta X$) between each point in the X direction of peaks and troughs measured peak-to-valley, wherein $\Delta X$ must be greater than and is preferably a multiple of S; (2) the spacing ($\Delta Y$) between each point in the Y direction of peaks and troughs measured peak-to-valley, wherein $\Delta Y$ must be greater than and is preferably a multiple of S; (3) the base thickness (T) of the diffusion element material; and (4) the maximum peak-to-valley height of peaks and troughs ($\Delta Z$) measured respective to the base thickness T of the diffusion element material. The index of refraction (N) of the diffusion element material is not shown but is also a modifier parameter.

A user defines a sector area by defining $\Delta X$ and $\Delta Y$ relative to a grid with unit size S. A random number generator defines Z values (peaks/troughs) at four corners of each sector within the grid. In a preferred embodiment, the random number generator is based on teachings disclosed in Park & Miller, "Random Number Generator: Good Ones are hard to Find, "*Communications of the ACM*, October 1988 Vol. 31, N6.10, p. 1192. However, in general psuedo random code generators can also be used. The simulator then interpolates Z values for each pixel within each sector based on the Z values at the ($\Delta X$, $\Delta Y$) locations defining the respective sectors in order to create a smoothly varying surface, for example, by first interpolating in either the X or the Y direction and then interpolating in the other direction by interpolating between first interpolated values. With reference to FIG. 4, if the random number generates the following values for Z:Z=20 at point (0, 0), Z=5 at point ($\Delta X$, 0), Z=13 at point (0, $\Delta Y$) and Z=25 at point ($\Delta X$, $\Delta Y$), then the value of Z can be determined by linear interpolation to be 15.5 at the pixel (100, 50). The simulator can use any form of interpolation such as linear or bicubic. Bicubic interpolation is preferred because it creates a smoother varying surface than does linear interpolation.

As a consequence of the random number generator determining the height Z at the four corners of each sector within the grid, each time the simulation is run for a user defined $\Delta X$, $\Delta Y$, $\Delta Z$, N and T, a different simulated surface will be generated. However, each simulated surface will have a similar distortion effect because the statistical randomness of Z across every point X, Y generated each time the simulation is run creates a common amount of distortion for a given $\Delta X$, $\Delta Y$, $\Delta Z$, N, and T.

An image is scanned and stored in the computer. The simulation generates and displays a distorted replica of the scanned image by generating Z values for each pixel as discussed above and then by calculating for each pixel of the scanned original image, a shift of the original image, DY, in the Y direction and a shift of the original image, DX, in the X direction.

The present invention includes a computer program product which is a storage medium including a computer program code mechanism which can be used to program a computer or a plurality of networked computers to perform the computer implemented method. The storage medium can include, but is not limited to, any type of disk including floppy disks, optical disks, CD-ROMs, and magneto optical disks, ROMs, RAMs, EPROMs, EEPROMS, magnetic or optical cards, or any type of media suitable for storing electronic instructions. The computer program code mechanism includes computer coded devices such as, but not limited to, software objects, software modules, routines, sub-routines, an instruction, a sequence of instructions and a plurality of instructions.

Figure 5A:
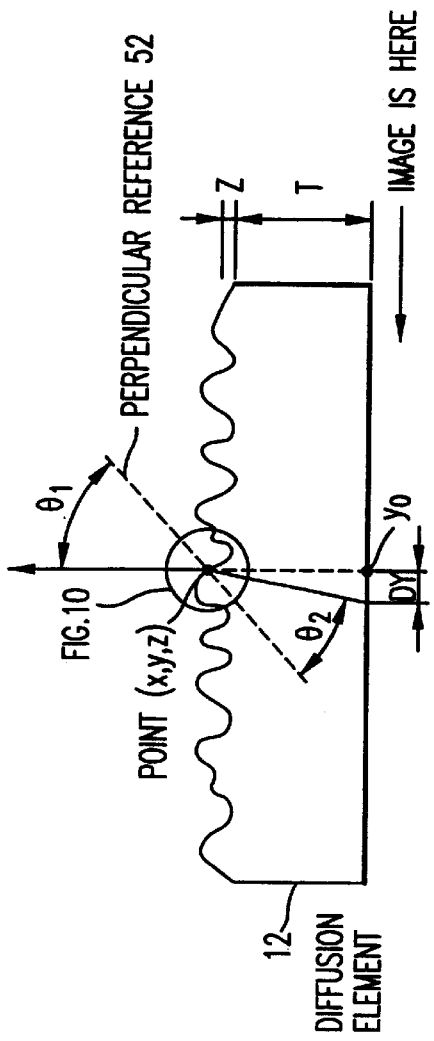
FIGS. 5a and 5b are schematic illustrations of a cross-section of the diffusion element.

Generation of DY and DX is next explained with reference to FIG. 5a, which illustrates a cross section of the diffusion element 12 in the (Y, Z) plane. DY=(T+Z) tan ($\Theta_1 - \Theta_2$) wherein $\Theta_1$ is calculated from the slope of the diffusion element 12 at pixel ($Y_0$, Z), which pixel corresponds to a grid intersection in FIG. 4, pursuant to the relationship tan $\Theta_1 = m_{YZ}$. With reference to FIG. 10, the slope of the diffusion element 12 at the point ($Y_0$, Z), $m_{YZ}$, is calculated by reference to pixels adjacent to ($Y_0$, Z) on the Y-axis ($Y_0 - S$, Z) and ($Y_0 + S$, Z). Thus, the slope $m_{YZ}$ is calculated as the slope of the line defined by ($Y_0 - S$, Z) and ($Y_0 + S$, Z). $\Theta_2$ is calculated from Snell's law (sin $\Theta_1 = N$ sin $\Theta_2$). $\Theta_1$ and $\Theta_2$ are determined relating to a line 52 perpendicular to the slope of the diffusion pattern at the point (X, $Y_0$, Z). If the slope of the diffusion pattern at (X, $Y_0$, Z) is negative, then $\Theta_1$ and $\Theta_2$ will be negative and thus the shift DY will be negative. If the slope of the diffusion pattern at (X, $Y_0$, Z) is positive, then $\Theta_1$ and $\Theta_2$ will be positive and thus the shift will be positive. See FIG. 5b. If the slope is 0 then the image will not be shifted. Lastly, the greater the magnitude the slope, the larger the shift.

Figure 5B:
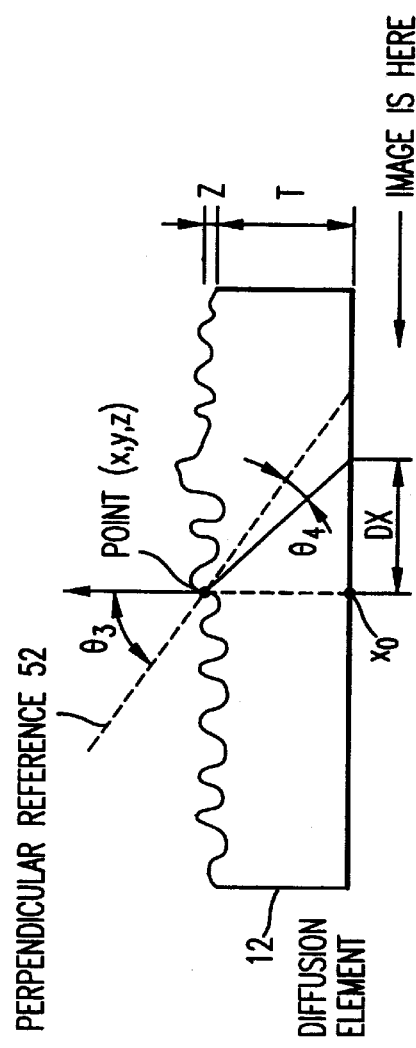

With reference to FIG. 5b, a cross section of the diffusion element 12 is shown in the (X, Z) plane. DX=(T+Z)tan($\Theta_3 - \Theta_4$) wherein $\Theta_3$ is calculated from the slope of the diffusion element 12 at pixel ($X_0$, Z), which pixel corresponds to a grid intersection in FIG. 4, pursuant to the relationship tan $\Theta_3 = m_{XZ}$. The slope of the diffusion element 12 at ($X_0$, Z), $m_{XZ}$, is calculated in reference to pixels adjacent to ($X_0$, Z) on the X-axis ($X_0 - S$, Z) (not shown) and ($X_0 + S$, Z) (not shown) and $\Theta_4$ is calculated from Snell's law (sin $\Theta_3 = N$ sin $\Theta_4$).

The parameters $\Delta X$, $\Delta Y$, $\Delta Z$, N and T are iteratively manually adjusted by the user until a subjectively acceptable painting-like effect is created by the simulated diffusion element on the selected image and preferably on numerous different images. Lastly, the generated height (Z) of the diffusion pattern at every point (X, Y) along the diffusion patterns surface is saved.

Figure 6C:
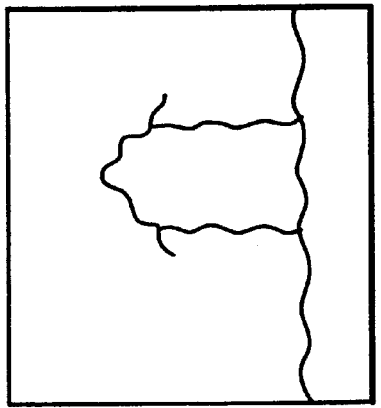
Figure 6B:
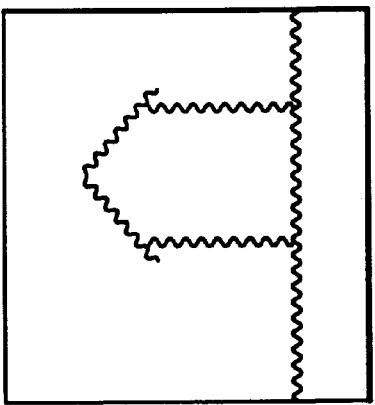
Figure 6A:
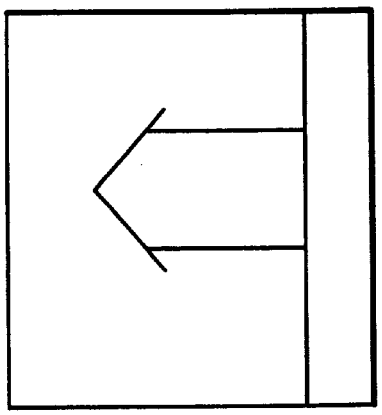
FIG. 6a is a schematic illustration of an original image of a picture of a house.

With reference to FIG. 6a, a schematic illustration of an original image 62 of a picture of a house is shown. FIGS. 6b, 6c, 6d and 6e indicate how changing the modifier parameters effect the degree of distortion to the original image shown in FIG. 6a. With reference to FIG. 6b, a small $\Delta X$ or $\Delta Y$ creates many oscillations, i.e., irregularities, for a given $\Delta Z$, N, and T, wherein a small $\Delta X$ or $\Delta Y$ is 50 microns or smaller. Whereas, with reference to FIG. 6c, a larger $\Delta X$ or $\Delta Y$ creates fewer oscillations and smaller irregularities because fewer random Z values are generated for a given ΔZ, N, and T, wherein a large ΔX or ΔY is 2 to 3 mm. ΔX and ΔY can be varied for different locations on the modifier. For example, ΔX and ΔY can be increased as you move from the center of the image, thus creating fewer oscillations and smaller irregularities nearer the perimeter of the image.

Figure 6E:
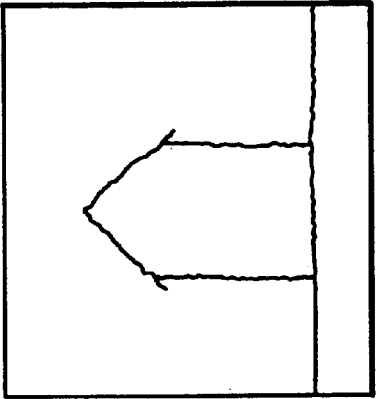
Figure 6D:
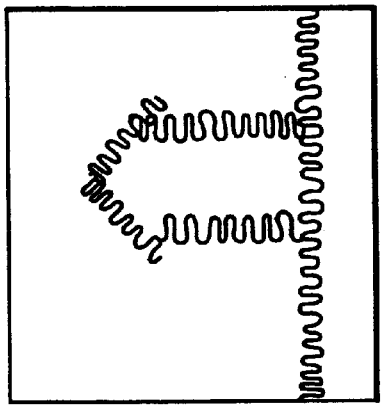

With reference to FIG. 6e, a small ΔZ and T decrease the amplitude of the oscillations for a given ΔX and ΔY, wherein a small ΔZ is 10 micron and a small T is 1.5 mm. Lastly, with reference to FIG. 6d, a large ΔZ and T increase the amplitude of oscillations for a given ΔX and ΔY, wherein a large ΔZ is 50 microns and a large T is 2 to 3 mm. The index of refraction, N, for optical glass is typically 1.5 and can only be nominally varied. Typically, therefore, the modifier parameters are within the following ranges: 10 $\mu$m<ΔX<3 mm, 10 $\mu$m<ΔY<3 mm, 10 $\mu$m<ΔZ<50 $\mu$m, N≅1.5, 1.5 mm<T<3 mm, and 10 $\mu$m<S<100 $\mu$m. A preferred embodiment of the modifier has the following parameters: ΔX=ΔY= 600 microns; T=2 mm; ΔZ=27.5 microns and N≅1.5.

Manufacturing the diffusion element 12 includes (1) manufacturing a master of the diffusion element utilizing the (X, Y, Z ) data generated by the software simulation and the T and ΔZ data defined by the designer, (2) creating a two-piece hollow rigid mold of the master, and (3) forming the actual diffusion element by poring heated optical plastic into the mold. The master is formed by placing a photoresist emulsion on a glass or plastic substrate which has a thickness (T) of between 1.5 and 3 mm, preferably 2 mm, and forming the diffusion pattern in the emulsion, wherein a photoresist emulsion is a chemical substance which has an insolubility which is a function of the amount of light exposure.

Figure 7:
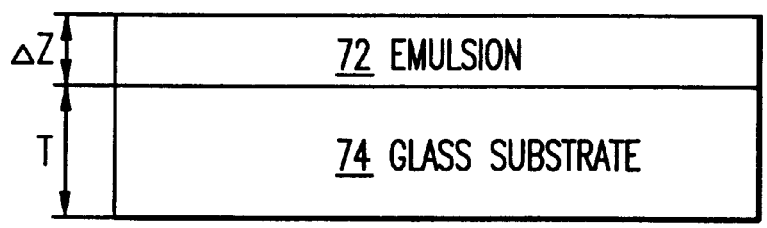
FIG. 7 is a schematic illustration of an emulsion formed on a glass substrate during manufacture of a master diffusion element.

Referring to FIG. 7, the emulsion 72 is placed on the glass substrate 74 with a uniform maximum thickness, ΔZ, of between 10 and 50 microns. A focused laser beam is used to expose (X, Y) pixels on the emulsion 72 in accordance with the simulation data generated by the software. The laser beam scans over the entire surface. Parts of the emulsion 72 contained on the glass substrate 74 are etched deeper than others by the laser beam according to the Z data and are therefore more exposed than the points not etched as deep. Parts of the emulsion 52 that are not to be etched by the laser beam (Z=ΔZ) are not exposed at all to the laser beam and thus create the tallest peaks, thereby creating the diffusion pattern. The technique used to manufacture the master is a standard photolithographic technique used in making printed circuits among other things.

Figure 8:
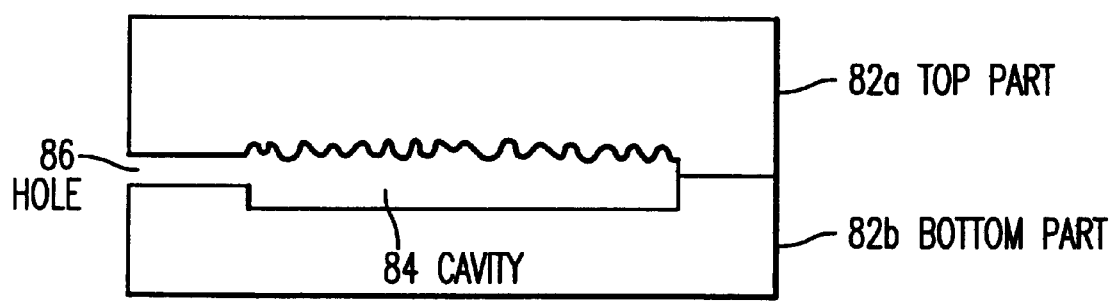
FIG. 8 is a schematic illustration of a mold replica of the master diffusion element used to create optical plastic diffusion elements.

After the master is manufactured, a rigid hollow mold of the master is created. The mold can be made of steel. Referring to FIG. 8, the mold is manufactured to be two pieces, a top part 82a replicating the emulsion part of the master and a bottom part 82b replicating the glass substrate. When the top part 82a is placed on top of the bottom part 82b, a cavity 84 in the shape of the master and a hole 86 is formed. The hole 86 is used to inject melted optical plastic.

Any optical plastic which can be injected into the mold, such as acrylic, polystyrene, polycarbonate or styrene acrylonitrile, is suitable to make the diffusion element 12. Acrylic is preferred because it is easy to manipulate during injection into the mold. The acrylic is heated until it turns to a liquid. It is then poured into the hole 86 of the mold until both the top part 82a and bottom part 82b are filled with the melted optical plastic. The optical plastic is then allowed to cool slowly. After the acrylic has cooled, the two pieces of the mold are separated and the diffusion element 12 is created.

According to another aspect of the invention, the diffusion element 12 can be used in the production of photographs of an image embodied in developed film by overlaying the diffusion element 12 with developed film during exposure of the photographic paper from which the photograph is to be formed. For this application, instead of contact overlaying, the diffusion element may be separated from the developed film by an optically suitable distance. After exposure, a photograph can then be conventionally produced from the exposed photosensitive medium.

Yet still according to another aspect of the invention, the diffusion element 12 can be used during photocopy reproduction of photographic images and drawing by overlaying the diffusion element 12 with the photographic image or picture before placing the photograph or picture in the bed of the photocopy machine.

Numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. An imaging system for producing image data representative of a distorted image of an original image, comprising:
   an irregularly translucent diffusion element configured to be overlayed with an original image bearing element; and,
   a scanner configured to scan an imaging area adjacent said original image bearing element overlayed with said diffusion element and produce image data representative of the original image modified by said diffusion element.

2. The imaging system of claim 1, wherein said diffusion element is placed between a source of scanning light of said scanner and said original image bearing element such that the scanning light from said scanner is reflected off the original image and distorted by said diffusion element.

3. The imaging system of claim 2, wherein said original image bearing element is a photograph or picture.

4. The imaging system of claim 1, wherein said diffusion element is placed between the source of scanning light of said scanner and said original image bearing element such that scanning light from said scanner is distorted by said diffusion element and then transmitted through the original image.

5. The imaging system of claim 4, wherein said original image bearing element is film or a slide.

6. The imaging system of claim 1, wherein said original image bearing element is placed between a source of scanning light of said scanner and said diffusion element such that scanning light from said scanner is transmitted through the original image and then distorted by said diffusion element.

7. The imaging system of claim 6, wherein said original image bearing element is film or a slide.

8. The imaging system of claim 1, wherein said diffusion element comprises a base portion with a base thickness T, an irregular portion extending from said base portion with a maximum thickness ΔZ, and is made of a material having an index of refraction N, where:

1.5 mm<$T$<3 mm;

10 $\mu$m<ΔZ<50 $\mu$m;

and, $N$≅1.5.

9. The imaging system of claim 8, wherein said irregular portion comprises sectors having corner points separated in a two dimensional X, Y grid by distances ΔX and ΔY which define peaks and troughs of said respective sectors, where:

10 μm<ΔX<3 mm;

and,

10 μm<ΔY<3 mm.

10. The imaging system of claim 9, where:

T=2 mm;

ΔZ=27.5 μm;

ΔX=600 μm;

and,

ΔY=600 μm.

11. The imaging system of claim 1, wherein said diffusion element comprises a material selected from the group consisting of acrylic, polystyrene, polycarbonate and styrene acrylonitrile.

12. The imaging system of claim 8, wherein said diffusion element comprises a material selected from the group consisting of acrylic, polystyrene, polycarbonate and styrene acrylonitrile.

13. The imaging system of claim 9, wherein said diffusion element comprises a material selected from the group consisting of acrylic, polystyrene, polycarbonate and styrene acrylonitrile.

14. The imaging system of claim 1, further comprising:

a printer configured to print a distorted image of the original image using said image data.

15. A method for producing image data representative of a distorted image of an original image, comprising the steps:

overlaying an irregular translucent diffusion element over an original image bearing element including said original image;

placing the original image bearing element with said diffusion element overlayed with the original image onto an imaging area; and, scanning the original image bearing element overlayed with the diffusion element with scanning light so as to produce light representative of a distorted image of said original image.

16. The method of claim 15, further comprising the step:

processing said light representative of said distorted image to produce said image data.

17. The method of claim 15, wherein:

said placing step comprises placing said diffusion element between said imaging area and said original image bearing element; and, said scanning step comprises receiving light passed through said diffusion element and reflected by said original image bearing element.

18. The method of claim 17, wherein said placing step comprises overlaying a photograph or picture with said distortion element.

19. The method of claim 15, wherein:

said placing step comprises placing said diffusion element between said imaging area and said original image bearing element; and, said scanning step comprises receiving light passed through said diffusion element and said original image bearing element.

20. The method of claim 19, wherein said placing step comprises overlaying a slide or film with said diffusion element.

21. The method of claim 15, wherein:

said placing step comprises placing said original image bearing element between said diffusion element and said imaging area; and, said scanning step comprises receiving light passed through said diffusion element and said original image bearing element.

22. The method of claim 21, wherein said placing step comprises overlaying a slide or film with said diffusion element.

23. The method of claim 16, further comprising the step:

printing a distorted image of said original image using said image data.

24. A method of producing a photograph of an original image embodied in a developed film, comprising the steps:

overlaying an irregular translucent diffusion element over undeveloped film bearing an original image;

exposing a photosensitive medium provided on a carrier with light transmitted through said diffusion element overlayed with said undeveloped film; and, producing a photograph from the exposed photosensitive medium provided on the carrier.

25. A method for producing image data representative of a distorted image of an original image, comprising the steps:

overlaying an irregular translucent diffusion element over an original image bearing element including said original image;

placing the original image bearing element with said diffusion element overlayed with the original image onto an imaging area; and, photocopying the original image bearing element overlayed with the diffusion element with photocopying light so as to produce light representative of a distorted image of said original image.

26. A computer implemented method for simulating the effects of a diffusion element having an index of refraction, N, on a two dimensional image stored in the computer's memory, comprising the steps of:

defining a grid of grid pixels having uniform spacing, S, and dimensioned in correspondence with the two dimensional image such that each grid pixel corresponds to an image pixel of the stored two dimensional image;

defining sectors having dimensions (ΔX, ΔY) within the grid, where ΔX and ΔY are multiples of S;

assigning height values, Z, at the grid pixel location of each corner of each sector, wherein said height values, Z, are determined relative to a base thickness, T, of the diffusion element being represented;

interpolating Z values for each grid pixel not having an assigned height value Z;

simulating distortion of said stored two dimensional image by the represented diffusion element by shifting for each image pixel corresponding to the respective grid pixels an amount in the X direction, DX, and an amount in the Y direction, DY, as a function of T, Z, and N; and, displaying a simulated distorted image.

27. The computer implemented method of claim 26, wherein said assigning step comprises assigning predetermined Z values.

28. The computer implemented method of claim 26, wherein said assigning step comprises assigning randomly generating Z values.

29. The computer implemented method of claim 26, wherein said simulating step comprises calculating DX and DY using the following equations:

$$DY=(T+Z)\tan(\Theta_1-\Theta_2)$$

and $$DX=(T+Z)\tan(\Theta_3-\Theta_4)$$

where $\Theta_1$=slope of the diffusion element in the (Y, Z) plane at the respective grid pixel, $\sin^{-1} \Theta_2=(\sin \Theta_1)/N$, $\Theta_3$=slope of the diffusion element in the (X, Z) plane at the respective grid pixel, and $\sin^{-1} \Theta_4=(\sin \Theta_3)/N$.

30. A computer program product, comprising a computer storage medium and a computer program code mechanism embedded in the computer storage medium for causing the computer to simulate the effects of a diffusion element having an index of refraction, N, on a two dimensional image stored in the computer's memory, the computer program code mechanism including:

- a first computer code device configured to define a grid of grid pixels having uniform spacing, S, and dimensioned in correspondence with the two dimensional image such that each grid pixel corresponds to an image pixel of the stored two dimensional image;
- a second computer code device configured to define sectors having dimensions ($\Delta X$, $\Delta Y$) within the grid, where $\Delta X$ and $\Delta Y$ are multiples of S;
- a third computer code device configured to assign height values, Z, at the grid pixel location of each corner of each sector, wherein said height values, Z, are determined relative to a base thickness, T, of the diffusion element being represented;
- a fourth computer code device configured to interpolate Z values for each grid pixel not having an assigned Z value;
- a fifth computer code device configured to simulate distortion of said stored two dimensional image by the represented diffusion element by shifting for each image pixel corresponding to the respective grid pixels an amount in the X direction, DX, and an amount in the Y direction, DY, as a function of T, Z, and N; and,
- a sixth computer code device configured to display a simulated distorted image.

31. The computer program product of claim 30, wherein said third computer code device is configured to assign predetermined Z values.

32. The computer program product of claim 30, wherein said third computer code device is configured to assign randomly generated Z values.

33. The computer program product of claim 30, wherein said fifth computer code device is configured to calculate DX and DY using the following equations:

$$DY=(T+Z)\tan(\Theta_1-\Theta_2)$$

and $$DX=(T+Z)\tan(\Theta_3-\Theta_4)$$

where $\Theta_1$=slope of the diffusion element in the (Y, Z) plane at the respective grid pixel, $\sin^{-1} \Theta_2=(\sin \Theta_1)/N$, $\Theta_3$=slope of the diffusion element in the (X, Z) plane at the respective grid pixel, and $\sin^{-1} \Theta_4=(\sin \Theta_3)/N$.

* * * * *